(12) United States Patent
Jiang et al.

(10) Patent No.: US 11,343,850 B2
(45) Date of Patent: May 24, 2022

(54) METHOD AND DEVICE IN UE AND BASE STATION

(71) Applicants: Qi Jiang, Shanghai (CN); XiaoBo Zhang, Shanghai (CN)

(72) Inventors: Qi Jiang, Shanghai (CN); XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 126 days.

(21) Appl. No.: 16/432,944

(22) Filed: Jun. 6, 2019

(65) Prior Publication Data
US 2019/0289637 A1  Sep. 19, 2019

Related U.S. Application Data

(63) Continuation of application No. PCT/CN2017/114526, filed on Dec. 5, 2017.

(30) Foreign Application Priority Data

Dec. 9, 2016 (CN) .......................... 201611127425.4

(51) Int. Cl.
*H04W 74/08* (2009.01)
*H04L 1/18* (2006.01)
(Continued)

(52) U.S. Cl.
CPC ....... *H04W 74/0808* (2013.01); *H04L 1/1812* (2013.01); *H04L 1/1829* (2013.01); *H04W 72/04* (2013.01); *H04W 72/14* (2013.01)

(58) Field of Classification Search
None
See application file for complete search history.

(56) References Cited

U.S. PATENT DOCUMENTS 7,751,364 B2 *  7/2010 Won ...................... H04L 5/0053
370/329
8,169,956 B2 *  5/2012 Malladi ................. H04L 1/1607
370/329
(Continued)

FOREIGN PATENT DOCUMENTS

CN   104768160 A   7/2015
CN   105007627 A   10/2015
(Continued)

OTHER PUBLICATIONS

U.S. Appl. No. 62/314,377, "UCI Piggyback in LAA", Kim et al., filed Mar. 28, 2016.*

(Continued)

*Primary Examiner* — Gregory B Sefcheck

(57) ABSTRACT

The present disclosure provides a method and a device in a User Equipment (UE) and a base station. The UE transmits M2 first type radio signal(s) in M2 time block(s) of M1 time blocks respectively, and transmits a second type radio signal; the second type radio signal is used to determine at least the former of the M2 time block(s) and M2 first type carrier(s); the M2 first type radio signal(s) is(are) transmitted on the M2 first type carrier(s) respectively; a first bit block is used to generate the M2 first type radio signal(s); the present disclosure designs the second type radio signal, which helps the base station determine a position of a carrier where transmission is actually performed and corresponding time block when narrowband UE performs uplink data transmission on unlicensed frequency spectrum. This further streamlines base station reception and improves uplink transmission performance.

16 Claims, 10 Drawing Sheets

(51) Int. Cl.
*H04W 72/14* (2009.01)
*H04W 72/04* (2009.01)

(56) References Cited

U.S. PATENT DOCUMENTS

| | | | | |
|---|---|---|---|---|
| 8,315,656 | B2* | 11/2012 | Yanover | H04W 72/042 455/509 |
| 9,763,199 | B2* | 9/2017 | Pelletier | H04W 52/146 |
| 9,867,070 | B2* | 1/2018 | Luo | H04L 5/001 |
| 10,219,295 | B2* | 2/2019 | Hugl | H04L 5/0057 |
| 10,244,509 | B2* | 3/2019 | Nigam | H04W 72/0406 |
| 10,355,830 | B2* | 7/2019 | Wiemann | H04L 1/1822 |
| 10,367,677 | B2* | 7/2019 | Parkvall | H04B 7/0695 |
| 10,531,479 | B2* | 1/2020 | Jung | H04L 5/0055 |
| 10,560,171 | B2* | 2/2020 | Kim | H04W 72/0406 |
| 10,616,911 | B2* | 4/2020 | Frederiksen | H04W 72/14 |
| 10,630,410 | B2* | 4/2020 | Parkvall | H04B 7/0452 |
| 10,694,496 | B2* | 6/2020 | Won | H04W 72/005 |
| 10,701,677 | B2* | 6/2020 | Park | H04W 72/0446 |
| 10,735,146 | B2* | 8/2020 | Wang | H04L 1/1671 |
| 10,856,289 | B2* | 12/2020 | Zheng | H04W 72/1263 |
| 11,005,635 | B2* | 5/2021 | Kudekar | H04L 5/0055 |
| 11,076,387 | B2* | 7/2021 | Oh | H04W 16/14 |
| 11,147,090 | B2* | 10/2021 | Lunttila | H04W 72/1289 |
| 2008/0316954 | A1* | 12/2008 | Zheng | H04W 28/20 370/315 |
| 2009/0046649 | A1* | 2/2009 | Gao | H04L 1/1861 370/329 |
| 2009/0086670 | A1* | 4/2009 | Hart | H04W 72/042 370/329 |
| 2017/0141833 | A1* | 5/2017 | Kim | H04L 1/0029 |
| 2018/0027549 | A1* | 1/2018 | Wang | H04L 5/0044 370/329 |
| 2018/0288787 | A1* | 10/2018 | Hooli | H04L 27/0006 |
| 2018/0332576 | A1* | 11/2018 | Oh | H04W 74/08 |
| 2018/0376490 | A1* | 12/2018 | Lunttila | H04W 72/1268 |
| 2019/0053265 | A1* | 2/2019 | Kim | H04L 5/0044 |
| 2020/0008162 | A1* | 1/2020 | Dinan | H04W 52/325 |

FOREIGN PATENT DOCUMENTS

| | | |
|---|---|---|
| CN | 105359593 A | 2/2016 |
| CN | 105530080 A | 4/2016 |
| CN | 105684488 A | 6/2016 |
| CN | 105722232 A | 6/2016 |
| CN | 105848165 A | 8/2016 |
| WO | 2015115738 A1 | 8/2015 |

OTHER PUBLICATIONS

U.S. Appl. No. 62/327,419, "UCI Piggyback in LAA", Kim et al., filed Apr. 25, 2016.*
U.S. Appl. No. 62/338,539, "UCI Piggyback in LAA", Kim et al., filed May 19, 2016.*
U.S. Appl. No. 62/340,518, "UCI Piggyback in LAA", Kim et al., filed May 23, 2016.*
ISR received in application No. PCT/CN2017/114526 dated Feb. 24, 2018.
NB-loT: Test Methods and Design Considerations, MCC TF160, 3GPPRAN5—SS vendors / MCC TF160 Workshop #35, R5w160415, Nov. 2, 2016.
CN First Search Report in application No. 201611127425.4 dated Nov. 13, 2019.
CN First Office Action in Application No. 201611127425.4 dated Nov. 25, 2019.
CN Grant Notice in Application No. 201611127425.4 dated Mar. 3, 2020.
CN Supplementary Search Report in application No. 201611127425.4 dated Feb. 17, 2020.

* cited by examiner

METHOD AND DEVICE IN UE AND BASE STATION

CROSS-REFERENCE TO RELATED APPLICATION

This application is a continuation of International Application No. PCT/CN2017/114526, filed on Dec. 5, 2017, claiming the priority benefit of Chinese Patent Application Serial Number 201611127425.4, filed on Dec. 9, 2016, the full disclosure of which is incorporated herein by reference.

BACKGROUND

Technical Field

The present disclosure relates to a transmission method and device in a wireless communication system, and more particularly to a transmission method and device used for unlicensed spectrum communication.

Related Art

In Rel-13 and Rel-14, Licensed-Assisted Access (LAA) focusing on DL-SCH transmission on unlicensed spectrum and Enhanced Licensed-Assisted Access (eLAA) focusing on UL-SCH transmission on unlicensed spectrum are discussed respectively and standardized in 3rd Generation Partner Project (3GPP). At the same time, Narrow Band Internet of Things (NB-IoT) and Enhanced Narrow Band Internet of Things (Enhanced NB-IoT) in Rel-13 and Rel-14 are also discussed and improved in 3GPP respectively.

In future mobile communications, narrow-band IoT applications on unlicensed spectrum will have broad commercial prospects, and NB-IoT transmission based on LAA and eLAA will be an important aspect to be studied.

SUMMARY

In the LAA and eLAA systems, an important feature of the base station and the user equipment (UE) is that Listen Before Talk (LBT) is required before transmission, that is, only when the user does not detect any signal on the unlicensed spectrum, it can occupy this channel for data transmission. The above method guarantees compatibility with Wi-Fi and other access technologies applied on unlicensed spectrum. Considering the issues of equity and spectrum occupancy, a continuous transmission needs to be limited by the Maximum Channel Occupancy Time (MCOT) of each country and region. However, in the NB-IoT system, especially in transmission on a Narrowband Physical Uplink Shared Channel (NPUSCH), due to bandwidth limitation, repeated transmission, and the introduction of Single-Tone transmission mode, one uplink transmission often takes up continuous time resources larger than MCOT, and then multiple LBTs will be required. Considering that LBT cannot be successful all the time, a problem of uncertainty will arise in uplink transmission.

A simple implementation is to limit a transmission on NPUSCH within one MCOT. Obviously, this method greatly limits the flexibility of scheduling and the amount of data transmitted at one time, thus fragmenting the uplink transmission.

In view of the above problem, the present disclosure provides a solution. It should be noted that, in the case of no conflict, the features in the embodiments and embodiments in the user equipment of the present disclosure can be applied to the base station, and vice versa. The features of the embodiments and the embodiments of the present disclosure may be combined with each other arbitrarily without conflict.

The present disclosure discloses a method for unlicensed spectrum communication in a user equipment (UE), comprising:

transmitting M2 first type radio signal(s) in M2 time block(s) of M1 time blocks respectively; and transmitting a second type radio signal;

wherein the second type radio signal is used to determine at least the former of the M2 time block(s) and M2 first type carrier(s); time domain resources occupied by the second type radio signal are behind the M2 time block(s); the M2 first type radio signal(s) is(are) transmitted on the M2 first type carrier(s) respectively; the M1 is a positive integer greater than 1; the M2 is 0 or a positive integer; the M2 is not greater than the M1; a first bit block is used to generate the M2 first type radio signal(s).

In one embodiment, an advantage of the foregoing method is that the UE indicates to the base station the time domain position of the M2 time block(s) by designing the second type of radio signal(s), which in turn determines the time domain position of transmission of the M2 first type radio signal(s), thereby simplifying the reception and decoding of the first bit block by the base station and reducing the implementation complexity of the base station side.

In one embodiment, another advantage of the foregoing method is that, because of the MCOT limitation, the UE cannot occupy the same frequency domain resource for uplink transmission for a long time, so the frequency domain position of the M2 first type radio signal(s) transmission is not fixed and is limited by the result of LBT. By designing the second type radio signal, the UE indicates the M2 first type carriers of the base station, and then determines of the transmitting of the M2 first type radio signal(s), thereby simplified the receiving and decoding of the first bit block by the base station. The implementation complexity of the base station side is reduced.

In one embodiment, the second type radio signal explicitly indicates at least the former of the M2 time block(s) and the M2 first type carrier(s).

In one embodiment, the M2 is less than the M1, and the UE maintains zero transmission power in the M1 time blocks and in the time domain resources other than the M2 time block(s).

In a sub-embodiment of the embodiment, the UE performs LBT in the time domain resources in the M1 time blocks other than the M2 time block(s) and discovers signals of other access technologies.

In one embodiment, the M2 is equal to the M1.

In one embodiment, the frequency domain resources occupied by the first type carrier are continuous and not less than 1.08 MHz In one embodiment, the frequency domain resources occupied by the first type carrier are continuous and are 20 MHz.

In one embodiment, the frequency domain resources occupied by the first type carrier are continuous and are 180 KHz (kilohertz).

In one embodiment, two of the first type carriers corresponding to any two of the M2 time windows that are adjacent in time domain are orthogonal (i.e., not overlapping) in the frequency domain.

In one embodiment, the maximum RF bandwidth that the UE can support is not greater than the bandwidth of the first type carrier.

In one embodiment, any two of the M1 time blocks are orthogonal (i.e., not overlapping) in the time domain.

In one embodiment, at least two of the M1 time blocks have different time lengths.

In one embodiment, all time blocks in the M1 time blocks have the same time length.

In one embodiment, the M1 time blocks are discontinuous in the time domain.

In one embodiment, the M1 time blocks are contiguous in the time domain.

In one embodiment, the duration time of the M1 time blocks are greater than one MCOT.

In one embodiment, the duration time of the time block is configurable.

In one embodiment, the duration time of the time block is fixed.

In one embodiment, the time block occupies a positive integer number of consecutive multi-carrier symbols in the time domain.

In one embodiment, the multi-carrier symbol in the present disclosure is one of an Orthogonal Frequency Division Multiplexing (OFDM) symbol, a Single-Carrier Frequency Division Multiple Access (SC-FDMA) symbol, a Filter Bank Multi Carrier (FBMC) symbol, an OFDM symbol including Cyclic Prefix (CP), and a Discrete Fourier Transform-Spreading-OFDM (DFT-s-OFDM) symbol including CP.

In one embodiment, the time block occupies consecutive T millisecond(s) (ms) in the time domain, the T is a positive integer.

In one embodiment, the first type radio signal(s) occupies (occupy) all or part of the time domain resources in the corresponding time block.

In one embodiment, the M2 is 0, and the step A is: maintaining zero transmission power in M1 time blocks.

In one embodiment, the second type radio signal is transmitted on the licensed spectrum.

In one embodiment, the second type radio signal is transmitted on the unlicensed spectrum.

In a sub-embodiment of the embodiment, the UE does not need to perform an LBT operation before transmitting the second type radio signal.

In a sub-embodiment of the embodiment, the UE does not need to perform a Clear Channel Assessment (CCA) or an Enhanced Clear Channel Assessment (ECCA) processes before transmitting the second type of radio signal(s).

In one embodiment, the second type radio signal is transmitted in a target time-frequency resource pool.

In a sub-embodiment of the embodiment, the target time-frequency resource pool is fixed.

In a sub-embodiment of the embodiment, the target time-frequency resource pool is configured by a higher layer signaling.

In one embodiment, the second type radio signal is transmitted on a physical layer data channel (i.e., a physical layer channel capable of carrying physical layer data).

In a sub-embodiment of the foregoing embodiment, the physical layer data channel is a Physical Uplink Shared Channel (PUSCH).

In a sub-embodiment of the foregoing embodiment, the physical layer data channel is a Short Latency Physical Uplink Shared Channel (sPUSCH).

In one embodiment, the first bit block is a Transport Block (TB).

In one embodiment, the first bit block includes a plurality of bits.

In one embodiment, the first bit block is a Transport Block (TB).

In one embodiment, the phrase that the first bit block is used to generate M2 first type radio signal(s) refers to: the M2 first type radio signal(s) is(are) (a part or all of) an output after the first bit block is sequentially subjected to channel coding, a modulation mapper, a layer mapper, precoding, a resource element (RE) mapper, and multi-carrier signal generation.

According to one embodiment of the present disclosure, the above method comprises:

receiving a first signaling;

wherein the first signaling is used to determine a first time-window; the M1 time blocks belong to the first time-window.

In one embodiment, the base station indicates the first time window, which increases scheduling flexibility and certainty.

In one embodiment, the transmission mode of the first type radio signal(s) in the first time window is fixed.

In one embodiment, the first signaling explicitly indicates the first time window.

In a subsidiary embodiment of the embodiment, the first signaling explicitly indicates a duration length of the first time window.

In one embodiment, the first signaling explicitly indicates a time difference between a start time of the first time window and an end time of receiving the first signaling.

In one embodiment, the time difference between the start time of the first time window and the end time of receiving the first signaling is fixed.

In one embodiment, the first signaling is dynamic signaling.

In one embodiment, the first signaling is an uplink grant (UL Grant).

In one embodiment, the first signaling is Downlink Control Information (DCI).

In a sub-embodiment of the foregoing three embodiments, the first signaling explicitly indicates a frequency domain position of a first sub-carrier set in the M2 first type carrier(s). The relative positions of the first subcarrier set in frequency domain of the M2 first type carrier(s) are the same, and the first type radio signal(s) is(are) transmitted on the first subcarrier set.

In a subsidiary embodiment of the sub-embodiment, the first sub-carrier set belongs to a Physical Resource Block (PRB) in the frequency domain.

In an example of the subsidiary embodiment, the sub-carriers included in the first sub-carrier set are consecutive in the corresponding PRB.

In an example of the subsidiary embodiment, the sub-carriers included in the first sub-carrier set are discrete in the corresponding PRB.

In one embodiment, the first signaling explicitly indicates at least one of the Modulation and Coding Status (MCS), a Hybrid Automatic Repeat reQuest (HARQ) process number, a New Data Indicator (NDI) and a Redundancy Version (RV) of the M2 first type radio signal(s).

According to one aspect of the present disclosure, the above method comprises:

receiving a second signaling;

wherein the second signaling is used to determine K1 first type carrier(s); at least one of the K1 first type carrier(s) is employed on unlicensed spectrum; the M2 first type carrier(s) makes(make) a subset of the K1 first type carrier(s).

In one embodiment, the above method is characterized in that: the base station flexibly configures the K1 first type carrier(s) according to the carrier occupancy condition detected by itself, so as to improve system efficiency and transmission success rate.

In one embodiment, the second signaling is Cell-Specific.

In one embodiment, the second signaling is UE-specific.

In one embodiment, the second signaling is terminal group-specific, and the UE is one terminal in the terminal group.

In one embodiment, the second signaling is transmitted on a broadcast channel (i.e., a downlink channel that can only be used to carry broadcast signals).

In a sub-embodiment of the foregoing embodiment, the broadcast channel includes a Narrowband Physical Broadcast Channel (NB-PBCH).

In one embodiment, the second type signal comprises (M2*N) bits, the N is equal to $\lceil \log_2(K1) \rceil$, the $\lceil X \rceil$ represents a largest positive integer less than (X+1).

In a sub-embodiment of the embodiment, the (N*i+1)th bit to the (N*i+N)th bit in the (M2*N) bits indicate the sequence number of the first type carrier corresponding to the i-th time block of the M2 time block(s) in the K1 first type carrier(s). The i is a positive integer not less than 1 and not greater than M2.

In a sub-embodiment of the embodiment, the second type radio signal further includes M1 bits, the M1 bits respectively indicate whether the UE maintains zero transmission power in the M1 time blocks.

In an example of the sub-embodiment, the M1 bits include M2 bit(s) which is(are) equal to "1", and the "1" indicates that zero transmission power is not maintained.

In one embodiment, the second type radio signal comprises (M1*N) bits, the N is equal to $\lceil \log_2(K1) \rceil$+1, $\lceil X \rceil$ represents a largest positive integer less than (X+1).

In a sub-embodiment of the embodiment, the (N*i+1)th bit in the (M1*N) bits indicates whether the UE maintains zero transmission power at the i-th time block of the M1 time blocks. The i is a positive integer not less than 1 and not greater than M2.

In a subsidiary embodiment of the sub-embodiment, the UE at the i-th time block in the M1 time blocks does not maintain zero transmission power, and the bits from the (N*i+2)th to the (N*i+N)th in the (M1*N) bits indicate the sequence number of the first type carrier corresponding to the i-th time blocks in the K1 first type carrier(s).

According to one aspect of the present disclosure, the above method comprises:

performing M1 times of monitoring in M1 time intervals;

wherein the M1 times of monitoring are respectively used to determine whether the first type radio signal(s) is(are) transmitted on the M1 time blocks.

In one embodiment, the above method is characterized in that the UE determines, by the LBT, whether and on which of the first type carriers the first type radio signal(s) will be transmitted.

In one embodiment, the M1 time intervals correspond to the M1 time blocks respectively.

In one embodiment, the monitoring includes a maximum of K1 time(s) of LBT, the K1 time(s) of LBT is(are) for the K1 first type carrier(s), respectively.

In one embodiment, the monitoring includes only one time of LBT, the one-time of LBT is for a target first type carrier in the K1 first type carrier(s).

In a sub-embodiment of the embodiment, the target first type carrier is determined by the UE itself.

In one embodiment, the time interval includes a positive integer number of slot(s), and one slot is used for one time of LBT.

In one embodiment, the LBT is 25 μs (microsecond) one-shot.

In one embodiment, the LBT is based on the operation of Category 4.

In one embodiment, the M1 time intervals are respectively located in T1 multicarrier symbol(s) before the starting multicarrier symbol corresponding to the M1 time blocks. The T1 is a positive integer.

In one embodiment, the M1 time intervals respectively correspond to the first T1 multicarrier symbol(s) in the M1 time blocks. The T1 is a positive integer.

According to another embodiment of the present disclosure, comprising:

receiving first Hybrid Automatic Repeat request Acknowledgement (HARQ-ACK);

wherein the first HARQ-ACK is used to determine whether the first bit block is correctly received.

In one embodiment, the first HARQ-ACK is transmitted on licensed spectrum.

According to another embodiment of the present disclosure, the first time window comprises Q1 first sub-time window(s); for each of the Q1 first sub-time window(s), transmitting respectively M2 first type radio signal(s) in M2 time block(s) of the M1 time blocks and performing once of the transmitted second type radio signal; the M1 time blocks belong to the first sub-time window corresponding to the M1 time blocks; the first bit block is used to generate all the M2 first type radio signal(s) that transmitted by the UE in the first time window; the Q1 is a positive integer.

In one embodiment, the above method is characterized in that the M1 time blocks are only a part of the first time window. The first bit block is repeatedly transmitted in the Q1 first sub-time window(s) to expand coverage.

In one embodiment, the Q1 is greater than 1, and the first bit block is a Transport Block (TB).

In the above embodiment, the UE transmits Q1 second type radio signals for the first bit block. In conventional schemes, scheduling information of a TB is usually transmitted only once.

In one embodiment, the UE repeatedly transmits Q1 time(s) of the M2 first type radio signal(s) in the first time window.

In a sub-embodiment of the embodiment, in the Q1 time(s) of the M2 first type radio signal(s), there are at least two of RVs corresponding to the M2 first type radio signal(s) that are different.

In a sub-embodiment of the embodiment, all RVs corresponding to the Q1 time(s) of the M2 first type radio signal(s) are the same.

In one embodiment, the first signaling indicates the Q1.

In one embodiment, one bit in the first bit block can only be mapped to one Resource Element (RE) in one of the first sub-time window.

According to one aspect of the present disclosure, the above method is characterized in that the monitoring comprises a positive integer number of time(s) of LBT, the positive integer number of time(s) of LBT is(are) for one of the first type carrier.

The present disclosure discloses a method in a base station for unlicensed spectrum communication, comprising:

receiving M2 first type radio signal(s) in M2 time block(s) of the M1 time blocks respectively; and receiving a second type radio signal;

wherein the second type radio signal is used to determine at least the former of the M2 time block(s) and the M2 first type carrier(s); the time domain resources occupied by the second type radio signal are behind the M2 time block(s); the M2 first type radio signal(s) is(are) transmitted on the M2 first type carrier(s) respectively; the M1 is a positive integer greater than 1, the M2 is 0 or a positive integer, and the M2 is not greater than M1; first bit block is used to generate the M2 first type radio signal(s).

According to another embodiment of the present disclosure, the method comprises:

transmitting a first signaling;

wherein the first signaling is used to determine a first time window, and the M1 time blocks belong to the first time window.

According to another embodiment of the present disclosure, the method comprises:

transmitting a second signaling;

wherein the second signaling is used to determine K1 first type carrier(s); at least one of the K1 first type carrier(s) is employed on unlicensed spectrum; the M2 first type carrier(s) makes(make) a subset of the K1 first type carrier(s).

According to one aspect of the present disclosure, the method comprises:

transmitting a first HARQ-ACK;

wherein the first HARQ-ACK is used to determine whether the first bit block is correctly received.

According to one aspect of the present disclosure, the first time window comprises Q1 first sub-time window(s); for each of the Q1 first sub-time window(s), receiving M2 first type radio signal(s) in M2 time block(s) of M1 time blocks respectively and receiving the second type radio signal is performed once; the M1 time blocks belong to the corresponding first sub-time window; the first bit block is used to generate all the M2 first type radio signal(s) that transmitted by the transmitter of the second type radio signal in the first time window; the Q1 is a positive integer.

The present disclosure discloses a user equipment (UE) for unlicensed spectrum communication, comprising:

a first transceiver, transmitting M2 first type radio signal(s) respectively in M2 time block(s) in the M1 time blocks; and a second transceiver, transmitting a second type radio signal;

wherein the second type radio signal is used to determine at least the former of the M2 time block(s) and the M2 first type carrier(s); the time domain resources occupied by the second type radio signal are behind the M2 time block(s); the M2 first type radio signal(s) is(are) transmitted on the M2 first type carrier(s) respectively; the M1 is a positive integer greater than 1, the M2 is 0 or a positive integer; the M2 is not greater than M1; first bit block is used to generate the M2 first type radio signal(s).

In one embodiment, the first transceiver further receives a first signaling; the first signaling is used to determine a first time window, the M1 time blocks belong to the first time window.

In one embodiment, the first transceiver further receives a second signaling; the second signaling is used to determine K1 first type carrier(s); at least one of the K1 first type carrier(s) is employed on unlicensed spectrum; the M2 first type carrier(s) makes(make) a subset of the K1 first type carrier(s).

In one embodiment, the first transceiver further performs M1 times of monitoring in M1 time intervals respectively; the M1 times of monitoring are respectively used to determine whether to transmit the first type radio signal(s) on the M1 time blocks.

In one embodiment, the second transceiver further receives a first HARQ-ACK; the first HARQ-ACK is used to determine whether the first bit block is correctly received.

According to one aspect of the user equipment used for unlicensed spectrum communication of the present disclosure, the first time window includes Q1 first sub-time window(s); for each of the Q1 first sub-time window(s), transmitting M2 first type radio signal(s) in M2 time block(s) of M1 time blocks respectively and transmitting the second type radio signal is performed once; the M1 time blocks belong to the corresponding first sub-time window; the first bit block is used to generate all the M2 first type radio signal(s) that transmitted by the UE in the first time window; the Q1 is a positive integer.

According to one aspect of the present disclosure, the UE used for unlicensed spectrum communication is characterized in that the monitoring comprises a positive integer number of time(s) of LBT; a positive integer number of time(s) LBT are for one of the first type carrier.

The present disclosure discloses a base station for unlicensed spectrum communication, comprising:

a third transceiver, receiving M2 first type radio signal(s) in M2 time block(s) of M1 time blocks respectively; and a fourth transceiver, receiving a second type radio signal;

wherein the second type radio signal is used to determine at least the former of the M2 time block(s) and the M2 first type carrier(s); the time domain resources occupied by the second type radio signal are behind the M2 time block(s); the M2 first type radio signal(s) is(are) transmitted on the M2 first type carrier(s) respectively; the M1 is a positive integer greater than 1; the M2 is 0 or a positive integer; the M2 is not greater than the M1; a first bit block is used to generate the M2 first type radio signal(s).

In one embodiment, the third transceiver further transmits a first signaling; the first signaling is used to determine a first time window, the M1 time blocks belong to the first time window.

In one embodiment, the third transceiver further transmits second signaling; the second signaling is used to determine K1 first type carrier(s); at least one of the K1 first type carrier(s) is employed on unlicensed spectrum; the M2 first type carrier(s) makes(make) a subset of the K1 first type carrier(s).

In one embodiment, the fourth transceiver further transmits a first HARQ-ACK; the first HARQ-ACK is used to determine whether the first bit block is correctly received.

According to one aspect of the base station for unlicensed spectrum communication of the present disclosure, the first time window comprises Q1 first sub-time window(s); for each of the Q1 first sub-time window(s) in the Q1 first sub-time window(s), receiving M2 first type radio signal(s) in M2 time block(s) of M1 time blocks respectively and receiving the second type radio signal is performed once; the M1 time blocks belong to the corresponding first sub-time window; the first bit block is used to generate all the M2 first type radio signal(s) that transmitted by the transmitter of the second type radio signal in the first time window; the Q1 is a positive integer.

Compared with the prior art, the present disclosure has the following advantages:

By designing the second type radio signal, the UE indicates to the base station the time domain position of the M2 time block(s), which in turn determines the time domain position of transmission of the M2 first type radio signal(s), thereby simplifying the reception and decoding of the first bit block by the base station and reducing the implementation complexity of the base station side.

When there is restriction of an MCOT, the UE cannot occupy same frequency domain resources for uplink transmission for a long time, so the position(s) of the M2 first type radio signal(s) transmission in frequency domain is(are) not fixed and is(are) limited by the result of the LBT. By designing the second type radio signal, the UE indicates to the base station the M2 first type carrier(s), and further determines the position of the transmission of the M2 first type radio signal(s) in frequency domain; thereby simplifying the reception and decoding of the first bit block by the base station and reducing the implementation complexity of the base station side.

By designing the first signaling and the second signaling, the first time window and the K1 first type carrier(s) are flexibly configured to optimize transmission and improve uplink transmission performance.

BRIEF DESCRIPTION OF THE DRAWINGS

Other features, objects, and advantages of the present disclosure will become more apparent from the detailed description of the accompanying drawings.

DESCRIPTION OF THE EMBODIMENTS

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment 1

Figure 1:
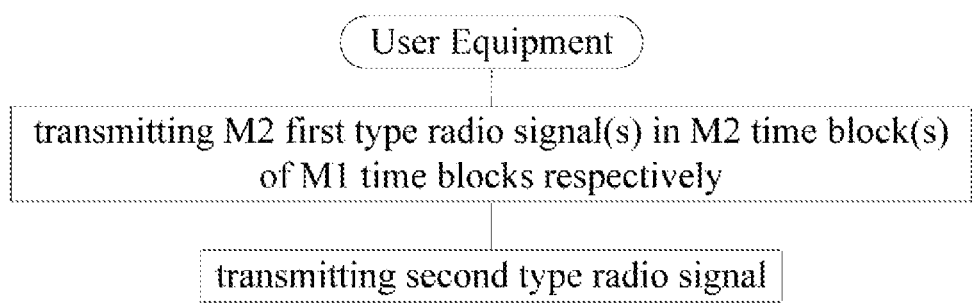
FIG. 1 shows a flowchart of M2 first type radio signal(s) according to one embodiment of the present disclosure.

Embodiment 1 shows a flow chart of M2 first type radio signal(s), as shown in FIG. 1.

In Embodiment 1, the user equipment in this disclosure first transmits respectively M2 first type radio signal(s) in M2 time block(s) of M1 time blocks, and then transmits a second type radio signal; the second type radio signal is used to determine at least the former of the M2 time block(s) and the M2 first type carrier(s); the time domain resources occupied by the second type radio signal are behind the M2 time block(s); the M2 first type radio signal(s) is(are) respectively transmitted on the M2 first type carrier(s); the M1 is a positive integer greater than 1, the M2 is 0 or a positive integer, and the M2 is not greater than the M1; the first bit block is used to generate the M2 first type radio signal(s).

In a sub-embodiment, the second type of radio signal explicitly indicates at least the former of the M2 time block(s) and the M2 first type carrier(s).

In a sub-embodiment, the M2 is less than the M1, and the UE maintains zero transmission power in the M1 time blocks and in the time domain resources outside the M2 time block(s).

In a subsidiary embodiment of the sub-embodiment, the UE performs LBT in the M1 time blocks and in the time domain resources outside the M2 time block(s) and discovers signals of other access technologies.

In a sub-embodiment, the M2 is equal to the M1.

In a sub-embodiment, the frequency domain resources occupied by the first type carrier are continuous and not less than 1.08 MHz (megahertz).

In a sub-embodiment, the frequency domain resources occupied by the first type carrier are continuous and are 20 MHz.

In a sub-embodiment, the frequency domain resources occupied by the first type carrier are continuous and are 180 KHz (kilohertz).

In a sub-embodiment, two of the first type carriers corresponding to any two of the M2 time windows that are adjacent in the time domain are orthogonal (i.e., not overlapping) in the frequency domain.

In a sub-embodiment, the maximum RF bandwidth that the UE can support is not greater than the bandwidth of the first type carrier.

In a sub-embodiment, any two of the M1 time blocks are orthogonal (i.e., not overlapping) in the time domain.

In a sub-embodiment, at least two of the M1 time blocks have different time lengths.

In a sub-embodiment, all time blocks in the M1 time blocks have the same time length.

In a sub-embodiment, the M1 time blocks are discontinuous in the time domain.

In a sub-embodiment, the M1 time blocks are contiguous in the time domain.

In a sub-embodiment, the duration time of each of the M1 time blocks is greater than one MCOT.

In a sub-embodiment, the duration time of the time block is configurable.

In a sub-embodiment, the duration time of the time block is fixed.

In a sub-embodiment, the time block occupies consecutive positive integer multi-carrier symbol(s) in the time domain.

In a sub-embodiment, the time block occupies consecutive T millisecond(s) (ms) in the time domain, the T is a positive integer.

In a sub-embodiment, the first type radio signal(s) occupies all or part of the time domain resources in the corresponding time block.

In a sub-embodiment, the M2 is 0; respectively transmitting M2 first type radio signals in the M2 time blocks in the M2 time blocks refers to maintaining zero transmission power in the M1 time blocks.

In a sub-embodiment, the second type radio signal is transmitted on the licensed spectrum.

In a sub-embodiment, the second type radio signal is transmitted on the unlicensed spectrum.

In a subsidiary embodiment of the sub-embodiment, the UE does not need to perform an LBT operation before transmitting the second type radio signal.

In a subsidiary embodiment of the sub-embodiment, the UE does not need to perform a CCA or an ECCA process before transmitting the second type radio signal.

In a sub-embodiment, the second type radio signal is transmitted in a target time-frequency resource pool.

In a subsidiary embodiment of the sub-embodiment, the target time-frequency resource pool is fixed.

In a subsidiary embodiment of the sub-embodiment, the target time-frequency resource pool is configured by higher layer signaling.

In a sub-embodiment, the second type radio signal is transmitted on a physical layer data channel (i.e., a physical layer channel capable of carrying physical layer data).

In a subsidiary embodiment of the sub-embodiment, the physical layer data channel is a PUSCH or a sPUSCH.

In a sub-embodiment, the first bit block is a TB

In a sub-embodiment, the first bit block includes a plurality of bits

In a sub-embodiment, the first bit block is a TB

Embodiment 2

Figure 2:
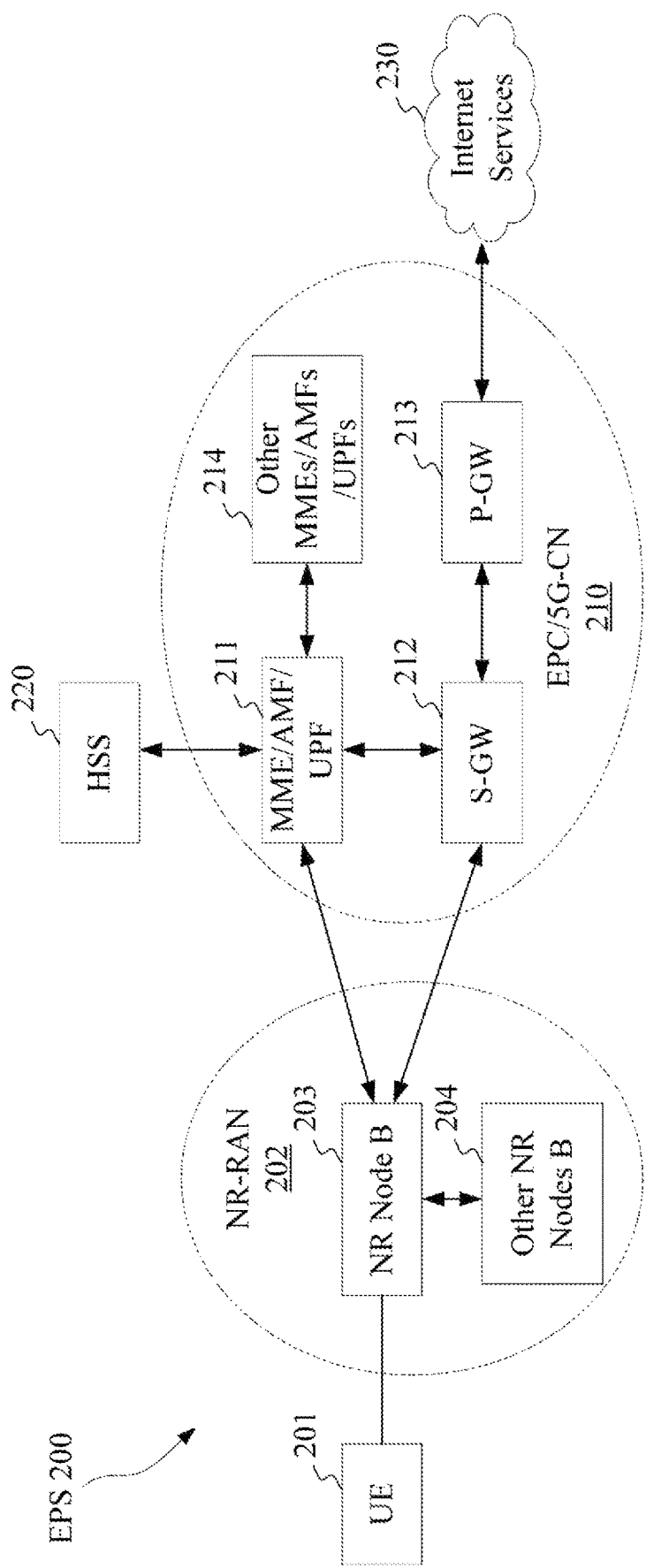
FIG. 2 shows a schematic diagram of a network architecture according to one embodiment of the present disclosure.

Embodiment 2 shows a schematic diagram of network architecture, as shown in FIG. 2.

Embodiment 2 shows a schematic diagram of network architecture according to the present disclosure, as shown in FIG. 2. FIG. 2 describes a network structure 200 of NR 5G, long-term evolution (LTE) and long-term evolution advanced (LTE-A) systems. The network architecture 200 of NR 5G or LTE may be referred to as an evolve packet system (EPS) 200 or some other suitable terminology. The EPS 200 may include one or more UEs 201, an NG-radio access network (RAN) 202, Evolved Packet Core/5G-core Network (EPC/5G-CN) 210, a Home Subscriber Server (HSS) 220 and an Internet service 230. The EPS 200 may be interconnected with other access networks, but for the sake of simplicity, these entities/interfaces are not shown. As shown in FIG. 2, the EPS provides packet switching services. Those skilled in the art would readily appreciate that various concepts presented throughout this disclosure can be extended to networks that provide circuit switching services or other cellular networks. The NG-RAN includes an NR Node B (gNB) 203 and other gNBs 204. The gNB 203 provides user and control plane protocol terminations for the UE 201. The gNB 203 can be connected to other gNBs 204 via an Xn interface (e.g., a backhaul). The gNB 203 may also be referred to as a base station, a base transceiver station, a wireless base station, a wireless transceiver, a transceiver function, a basic service set (BSS), an extended service set (ESS), a transmission and reception point (TRP), or some other suitable terminology. The gNB 203 provides the UE201 with an access point to the 5G-CN/EPC 210. Examples of the UE201 includes cellular telephones, smart phones, Session Initiation Protocol (SIP) phones, laptop computers, personal digital assistants (PDAs), satellite Radios, non-ground base station communications, satellite mobile communications, global positioning systems (GPSs), multimedia devices, video devices, digital audio player (e.g. MP3 players), cameras, game consoles, drones, aircrafts, narrowband physical network devices, machine type communication devices, land vehicles, automobiles, wearable devices, or any other devices with similar functions. A person skilled in the art may also refer to UE 201 as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, handset, a proxy, a mobile client, a client or some other suitable term. The gNB 203 is connected to the EPC/5G-CN 210 through an S1/NG interface. The EPC/5G-CN 210 includes an MME/AMF/UPF 211, other Mobility Management Entity (MME)/Authentication Management Field (AMF)/User Plane Function (UPF) 214 a Service Gateway (S-GW) 212 and a Packet Date Network Gateway (P-GW) 213. The MME/AMF/UPF 211 is a control node that handles a signaling between the UE 201 and the EPC/5G-CN 210. In general, the MME/AMF/UPF 211 provides bearer and connection management. All User Internet Protocol (IP) packets are transmitted through the S-GW 212, and the S-GW 212 itself is connected to the P-GW 213. The P-GW 213 provides UE IP address allocation as well as other functions. The P-GW 213 is connected to the internet service 230. The internet service 230 includes an operator-compatible internet protocol (IP) service, and may specifically include Internet, an intranet, an IP Multimedia Subsystem (IMS), and a packet switching Streaming service (PSS).

In a sub-embodiment, the gNB 203 corresponds to the base station in this disclosure.

In a sub-embodiment, the UE 201 corresponds to the user equipment in this disclosure.

In a sub-embodiment, the UE201 supports the radio communications on unlicensed spectrum.

In a sub-embodiment, the gNB 203 supports the radio communication on an unlicensed spectrum.

Embodiment 3

Figure 3:
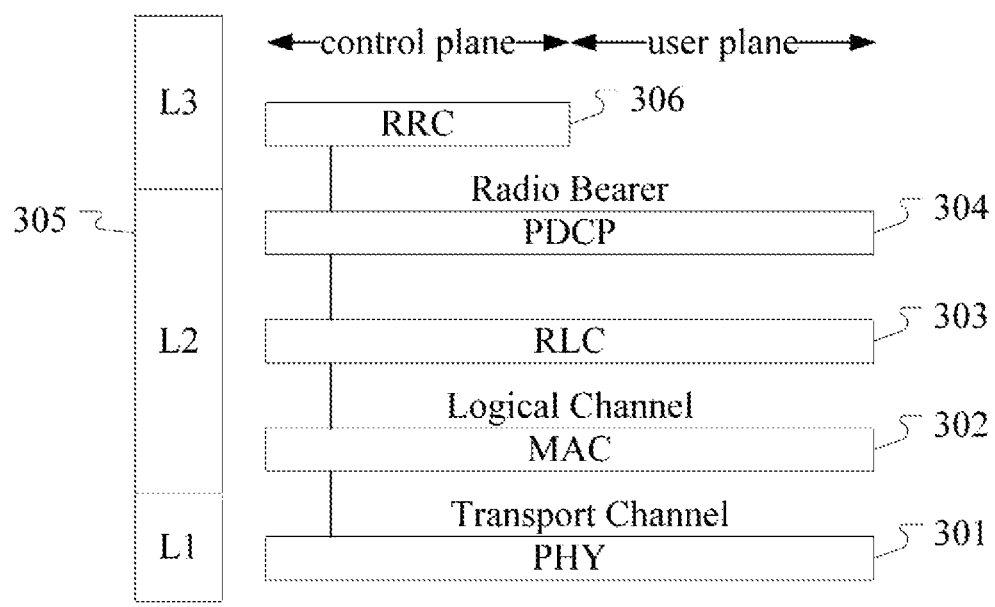
FIG. 3 shows a schematic diagram of a radio protocol architecture of a user plane and a control plane according to one embodiment of the present disclosure.

Embodiment 3 shows a schematic diagram of a radio protocol architecture of a user plane and a control plane according to one embodiment of the present disclosure, as shown in FIG. 3.

FIG. 3 is a schematic diagram illustrating an embodiment of a wireless protocol architecture for a user plane and a control plane, and FIG. 3 shows a wireless protocol architecture for the user equipment (UE) and the base station (gNB or eNB) in three layers: layer 1, layer 2 and layer 3. Layer 1 (L1 layer) is the lowest layer and implements various physical layer (PHY) signal processing functions, and layers above layer 1 belong to higher layers. The L1 layer will be referred to herein as PHY 301. Layer 2 (L2 layer) 305 is above PHY 301 and is responsible for the link between the UE and the gNB through PHY 301. In the user plane, L2 layer 305 comprises a media access control (MAC) sub-layer 302, a radio link control (RLC) sub-layer 303 and a packet data convergence protocol (PDCP) sub-layer 304, and these sub-layers terminate at the gNB on the network side. Although not illustrated, the UE may have several upper layers above the L2 layer 305, including a network layer (e.g. an IP layer) terminated at the P-GW on the network side and an application layer terminated at the other side of the connection (e.g. peer UE, a server, etc.). The PDCP sub-layer 304 provides multiplexing between different radio bearers and logical channels. The PDCP sublayer 304 also provides header compression for an upper layer data packet to reduce radio transmission overhead, and provides security by encrypting a packet, and provides support for UE handover between gNBs. The RLC sublayer 303 provides segmentation and reassembling of an upper layer data packet, retransmission of a lost packet and reordering of a packet to compensate for the disordered reception resulted from the hybrid automatic repeat request (HARQ). The MAC sublayer 302 provides multiplexing between the logical and transport channels. The MAC sublayer 302 is also responsible for allocating various radio resources (e.g. resource blocks) in one cell between UEs. The MAC sublayer 302 is also responsible for HARQ operation. In the control plane, the radio protocol architecture for the UE and the gNB is almost the same as the radio protocol architecture in the user plane on the PHY 301 and the L2 layer 305, but there is no header compression function for the control plane. The control plane also includes a Radio Resource Control (RRC) sublayer 306 in Layer 3 (L3 layer). The RRC sublayer 306 is responsible for obtaining radio resources (i.e., wireless bearers) and configuring a lower layer using an RRC signaling between the gNB and the UE.

In a sub-embodiment, the radio protocol architecture of FIG. 3 is applicable to the user equipment in this disclosure.

In a sub-embodiment, the radio protocol architecture of FIG. 3 is applicable to the base station in this disclosure In a sub-embodiment, the first signaling in the present disclosure is generated by the PHY 301.

In a sub-embodiment, the second signaling in the present disclosure is generated by the RRC sublayer 306.

In a sub-embodiment, the first HARQ-ACK in the present disclosure is generated by the PHY 301.

Embodiment 4

Figure 4:
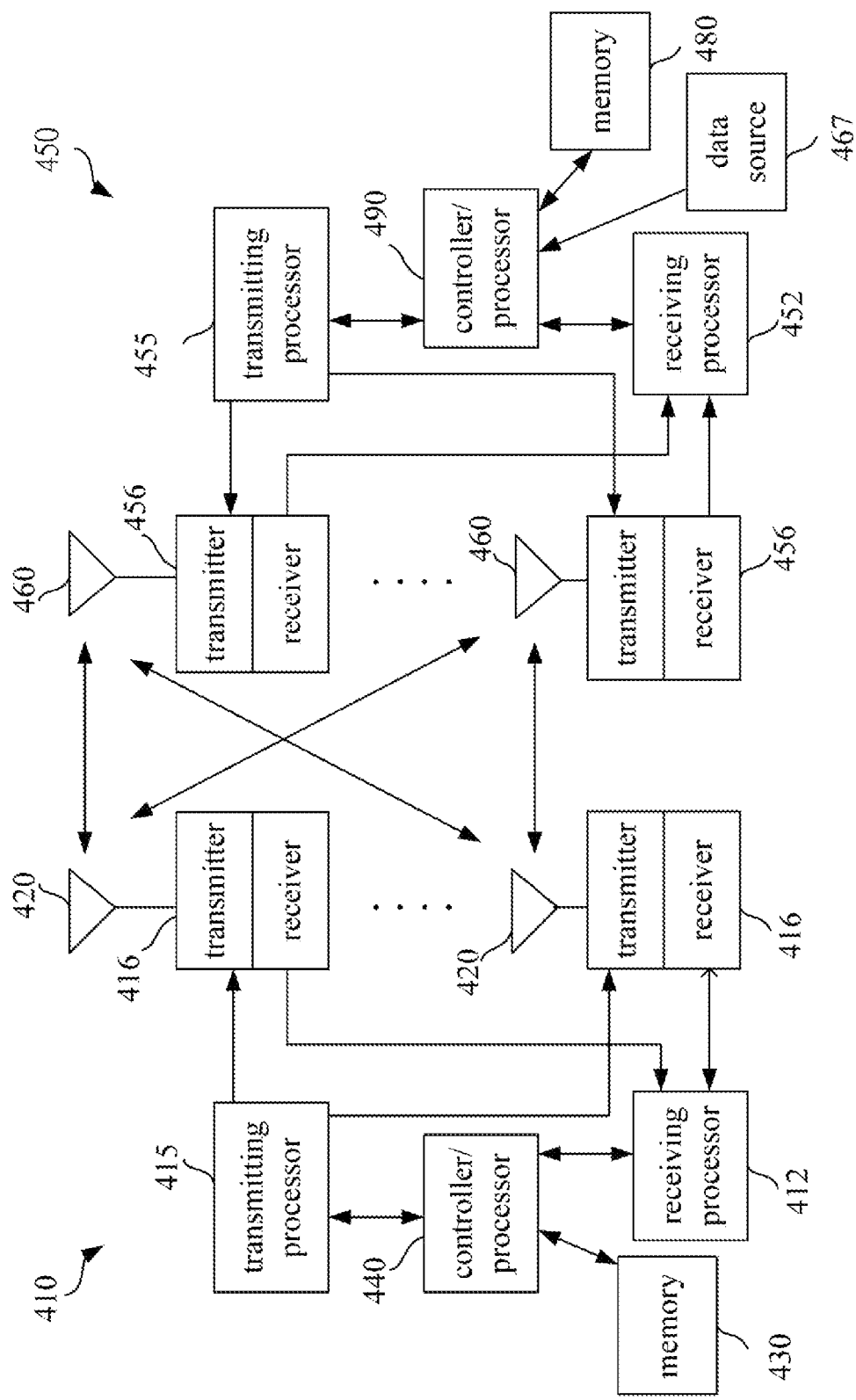
FIG. 4 shows a schematic diagram of an evolved node and a UE according to one embodiment of the present disclosure.

Embodiment 4 illustrates a schematic diagram of a base station and user equipment according to the present disclosure, as shown in FIG. 4. In FIG. 4, is a block diagram of a gNB 410 in communication with a UE 450 in an access network The base station (410) includes a controller/processor 440, a memory 430, a receiving processor 412, a transmitting processor 415, a transmitter/receiver 416, and an antenna 420.

The user equipment (450) includes a controller/processor 490, a memory 480, a data source 467, a transmitting processor 455, a receive processor 452, a transmitter/receiver 456, and an antenna 460.

In UL (Uplink), processes related to the base station (410) include:

the receiver 416, which receives the radio frequency signal through its corresponding antenna 420, converts the received radio frequency signal into a baseband signal, and supplies the baseband signal to the receiving processor 412;

the receiving processor 412, which implements various signal receiving processing functions for the L1 layer (i.e., the physical layer) including decoding, deinterleaving, descrambling, demodulation, and physical layer control signaling extraction, and the like;

the controller/processor 440, which implements L2 layer functions, and associated with memory 430 storing program code and data;

the controller/processor 440, which provides demultiplexing between the transport and logical channels, packet reassembling, decryption, header decompression, control signal processing in order to recover the upper layer packets from UE 450; the upper layer packets from controller/processor 440 can be provided to the core network;

the controller/processor 440, which determines to respectively receive M2 first type radio signal(s) in M2 time block(s) of the M1 time blocks, and confirms to receive the second type radio signal;

In UL transmission, processes related to the user equipment 450 include:

the data source 467, which provides the upper layer packet to a controller/processor 490. The data source 467 represents all protocol layers above the L2 layer;

the transmitter 456, which transmits radio frequency signals through its respective antenna 460, converts a baseband signal to a radio frequency signal, and provides the radio frequency signal to the respective antenna 460;

the transmit processor 455, which implements for the L1 layer (i.e. physical layer) of the various signal processing functions including decoding, deinterleaving, descrambling, demodulation and physical layer signaling extraction and the like;

the controller/processor 490, which implements header compression, encryption, packet segmentation and reordering, and multiplexing between logical and transport channels based on wireless resource allocation of the gNB 410, so as to implements L2 layer functions for the user plane and the control plane;

the controller/processor 490 is also responsible for HARQ operation, retransmission of a lost packet, and a signaling to the gNB 410;

the controller/processor 490, which determines to respectively transmit M2 first type radio signal(s) in M2 time block(s) of the M1 time blocks, and confirms to transmit the second type radio signal.

In a sub-embodiment, the UE 450 includes: at least one processor and at least one memory, the at least one memory including computer program codes; the at least one memory and the computer program code are configured to operate with the processor together, the UE 450 at least: respectively transmitting M2 first type radio signal(s) in M2 time block(s) of the M1 time blocks and transmitting the second type radio signal; the second type radio signal is used for determining at least the former of the M2 time block(s) and the M2 first type carrier(s); the time domain resources occupied by the second type radio signal are behind the M2 time block(s); the M2 first type radio signal(s) is(are) respectively transmitted on the M2 first type carrier(s); the M1 is a positive integer greater than 1, the M2 is 0 or a positive integer, the M2 is not greater than the M1; the first bit block is used to generate the M2 first type radio signal(s).

In a sub-embodiment, the UE 450 includes a memory storing a computer readable instruction program, which generates an action when executed by at least one processor, and the action comprises: transmitting M2 first type radio signal(s) in M2 time block(s) of M1 time blocks and transmitting second type radio signal; the second type radio signal is used for determining at least the former of the M2 time block(s) and the M2 first type carrier(s); the time domain resources occupied by the second type radio signal are behind the M2 time block(s); the M2 first type radio signal(s) is(are) respectively transmitted on the M2 first type carrier(s); the M1 is a positive integer greater than 1, the M2 is 0 or a positive integer, the M2 is not greater than the M1; the first bit block is used to generate the M2 first type radio signal(s).

In one embodiment, the gNB 410 device includes: at least one processor and at least one memory, the at least one memory includes computer program codes; the at least one memory and the computer program code are configured to be operated with at least one processor together. The gNB 410 device at least: receives M2 first type radio signal(s) in M2 time block(s) of M1 time blocks; and receives a second type radio signal; the second type radio signal is used for determining at least the former of the M2 time block(s) and the M2 first type carrier(s); the time domain resources occupied by the second type radio signal are behind the M2 time block(s); the M2 first type radio signal(s) is(are) respectively transmitted on the M2 first type carrier(s); the M1 is a positive integer greater than 1, the M2 is 0 or a positive integer, the M2 is not greater than the M1; the first bit block is used to generate the M2 first type radio signal(s)

In a sub-embodiment, the gNB 410 includes: a memory storing a computer readable instruction program, which generates an action when executed by at least one processor, the action comprising: receiving respectively M2 first type radio signal(s) in M2 time block(s) of M1 time blocks; receiving a second type radio signal; the second type radio signal is used for determining at least the former of the M2 time block(s) and the M2 first type carrier(s); the time domain resources occupied by the second type radio signal are behind the M2 time block(s); the M2 first type radio signal(s) is(are) respectively transmitted on the M2 first type carrier(s); the M1 is a positive integer greater than 1, the M2 is 0 or a positive integer, the M2 is not greater than the M1; the first bit block is used to generate the M2 first type radio signal(s).

In a sub-embodiment, the UE 450 corresponds to the user equipment in this disclosure.

In a sub-embodiment, gNB 410 corresponds to the base station in this disclosure.

In a sub-embodiment, the controller/processor 490 is configured to determine that M2 first type radio signal(s) are respectively transmitted in M2 time block(s) of the M1 time blocks, and is(are) used to determine transmitting the second type radio signal.

In a sub-embodiment, at least first two of the receiver 456, the receiving processor 452, and the controller/processor 490 are used to receive at least one of the first signaling and the second signaling.

In a sub-embodiment, at least first two of the receiver 456, the receiving processor 452, and the controller/processor 490 are used to perform M1 times monitoring in M1 time intervals, respectively.

In a sub-embodiment, at least first two of the receiver 456, the receiving processor 452, and the controller/processor 490 are used to receive the first hybrid automatic repeat request acknowledgement.

In a sub-embodiment, at least first two of the transmitter 456, the transmitting processor 455, and the controller/processor 490 are used to respectively transmit M2 first type radio signal(s) in M2 time block(s) of the M1 time blocks.

In a sub-embodiment, at least first two of the transmitter 456, the transmitting processor 455, and the controller/processor 490 are used to transmit a second type radio signal.

In a sub-embodiment, the controller/processor 440 is configured to determine that M2 first type radio signal(s) are respectively received in M2 time block(s) of the M1 time blocks, and is(are) used to determine receiving the second type radio signal.

In a sub-embodiment, at least first two of the transmitter 416, the transmitting processor 415, and the controller/processor 440 are used to transmit at least one of the first signaling and the second signaling.

In a sub-embodiment, at least first two of the transmitter 416, the transmitting processor 415, and the controller/processor 440 are used to transmit a first hybrid automatic repeat request acknowledgement.

In a sub-embodiment, at least first two of the receiver 416, the receiving processor 412, and the controller/processor 440 are used to receive M2 first type radio signal(s) respectively in M2 time block(s) of the M1 time blocks.

In a sub-embodiment, at least first two of the receiver 416, the receiving processor 412, and the controller/processor 440 are used to receive the second type radio signal.

Embodiment 5

Figure 5:
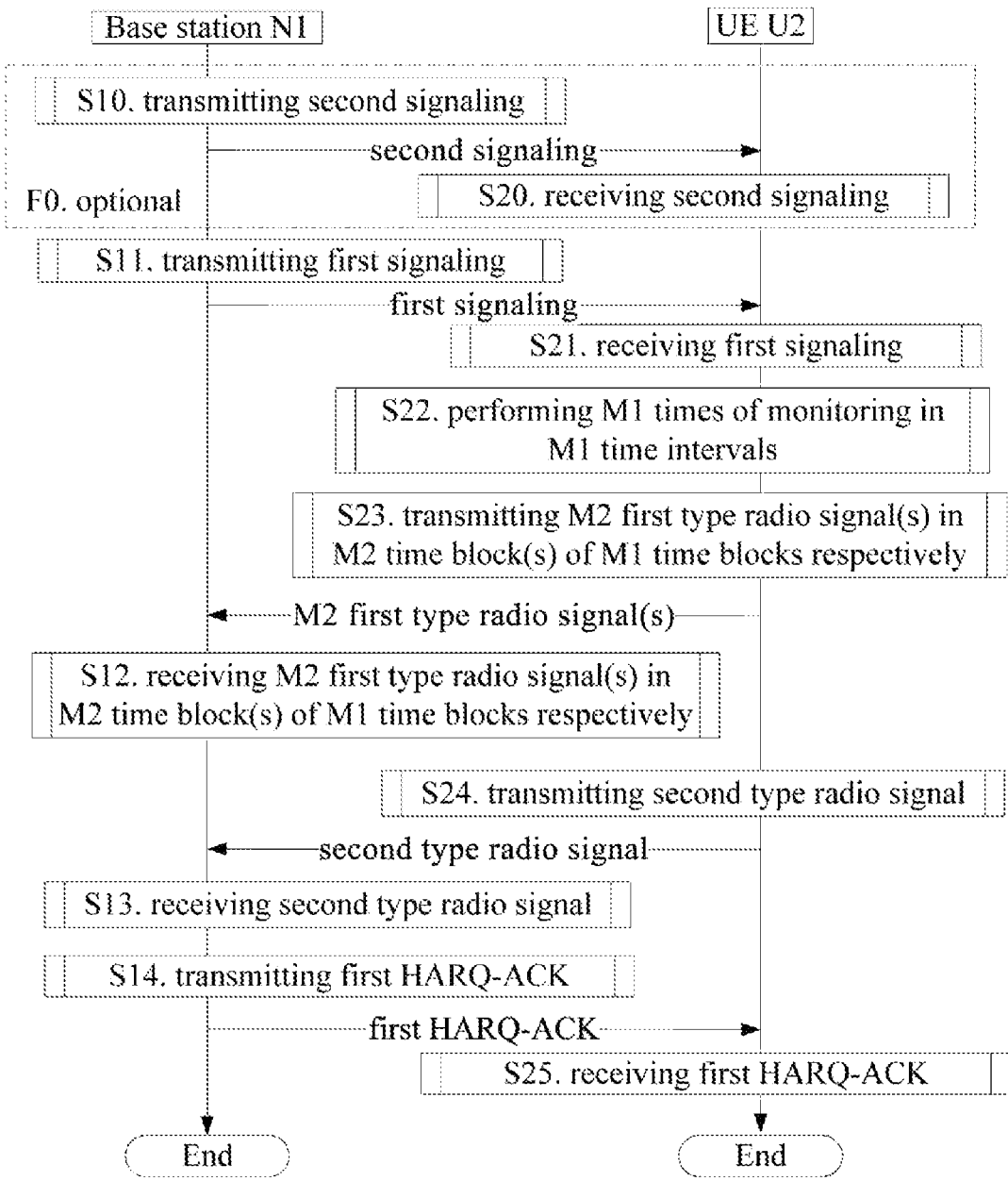
FIG. 5 shows a flow chart of a second type radio signal transmission according to one embodiment of the present disclosure.

Embodiment 5 illustrates a flow chart of the second type radio signal transmission, as shown in FIG. 5. In FIG. 5, the base station N1 is a maintenance base station for a serving cell of the UE U2. The steps identified in the box F0 are optional.

For the base station N1, in step S10, the base station N1 transmits a second signaling; in step S11, the base station N1 transmits a first signaling; in step S12, the base station N1 receives M2 first type radio signal(s) in M2 time block(s) of the M1 time blocks, respectively; in step S13, the base station N1 receives a second type radio signal; in step S14, the base station N1 transmits a first HARQ-ACK.

For the user equipment U2, in step S20, the user equipment U2 receives a second signaling; in step S21, the user equipment receives a first signaling; in step S22, the user equipment performs M1 times monitoring in M1 time intervals, respectively; in step S23, the user equipment U2 transmits M2 first type radio signal(s) in M2 time block(s) of the M1 time blocks, respectively; in step S24, the user equipment U2 transmits a second type radio signal; in step S25, the user equipment U2 receives a first HARQ-ACK.

In Embodiment 5, the second type radio signal is used to determine at least the former of the M2 time block(s) and the M2 first type carrier(s); the time domain resources occupied by the second type radio signal is behind the M2 time block(s); the M2 first type radio signal(s) is(are) respectively transmitted on the M2 first type carrier(s); the M1 is a positive integer greater than 1, the M2 is 0 or a positive integer; the M2 is not greater than the M1; the first bit block is used to generate the M2 first type radio signal(s); the first signaling is used to determine a first time window; the M1 time blocks belongs(belong) to the first time window; the second signaling is used to determine K1 first type carrier(s); at least one of the K1 first type carrier(s) is employed on unlicensed spectrum; the M2 first type carrier(s) makes (make) a subset of the K1 first type carrier(s); the M1 times monitoring is respectively used to determine whether to transmit the first type radio signal(s) on the M1 time blocks; the first HARQ-ACK is used to determine whether the first bit block is correctly received; the first time window includes Q1 first sub-time window(s); for each of the Q1 first sub-time window(s); transmitting respectively M2 first type radio signal(s) in M2 time block(s) of the M1 time blocks and transmitting the second type radio signal; the M1 time blocks belong to the corresponding first sub-time windows; the first bit block is used to generate all the M2 first type radio signal(s) that are transmitted by the user equipment U2 in the first time window; the Q1 is a positive integer; the monitoring comprises a positive integer times of listening-before-talk, and the positive integer of listening-before-talk is for one the first type carriers.

In a sub-embodiment, the transport channel corresponding to the first type radio signal(s) is a UL-SCH.

In a sub-embodiment, the physical layer channel corresponding to the first type radio signal(s) is an NPUSCH.

In a sub-embodiment, the physical layer channel corresponding to the second radio signal(s) is an NPUSCH or a NPUCCH (Narrowband Physical Uplink Control Channel).

In a sub-embodiment, the second signaling includes one or more RRC (Radio Resource Control) IE (Information Element).

In a sub-embodiment, the first HARQ-ACK is transmitted in an uplink grant.

Embodiment 6

Figure 6:
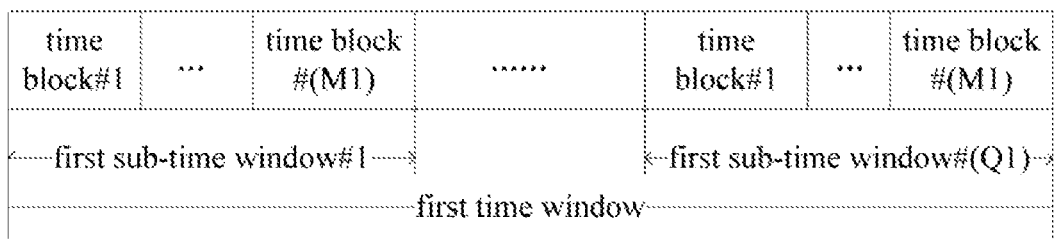
FIG. 6 shows a schematic diagram of a first time window according to one embodiment of the present disclosure.

Embodiment 6 illustrates a schematic diagram of a first time window according to the present disclosure, as shown in FIG. 6. In FIG. 6, the first time window includes Q1 first sub-time window(s), and the first sub-time window includes M1 time blocks. Both Q1 and M1 are integers greater than 1.

In a sub-embodiment, the Q1 first sub-time windows are continuous in the time domain.

In a sub-embodiment, the M1 time blocks are continuous in the time domain.

In a sub-embodiment, the duration time of the M1 time blocks in the time domain is equal.

In a sub-embodiment, the duration time of the time block in the time domain is equal to one MCOT.

In a sub-embodiment, the duration time of the time block in the time domain is configurable.

Embodiment 7

Figure 7:
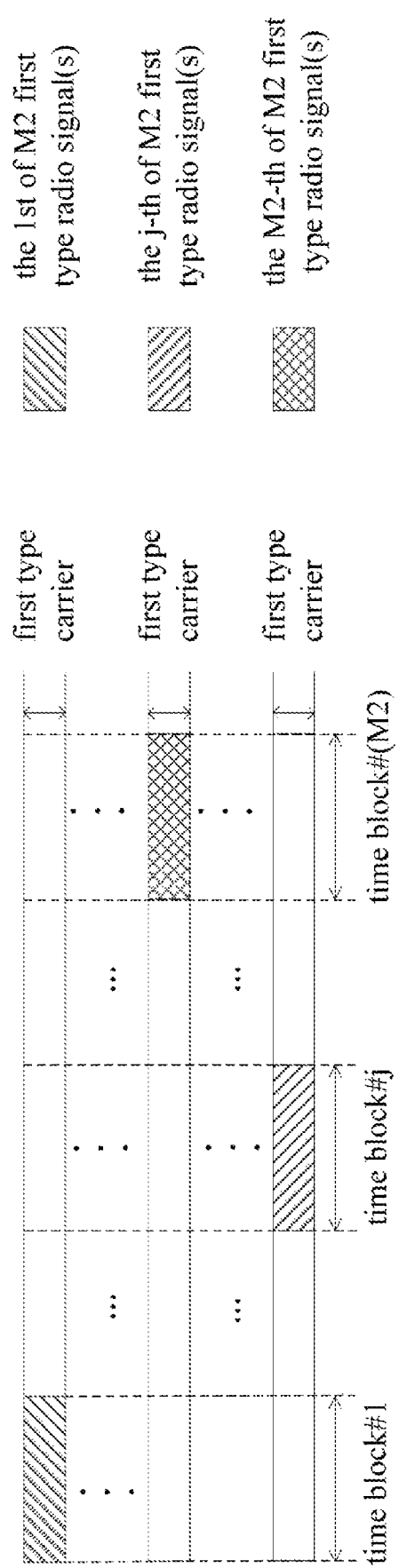
FIG. 7 shows a schematic diagram of M2 first type radio signal(s) according to one embodiment of the present disclosure.

Embodiment 7 illustrates a schematic diagram of M2 first type radio signal(s), as shown in FIG. 7. In FIG. 7, the M2 first type radio signal(s) are respectively transmitted on M2 first type carriers, and the M2 first type carrier(s) makes (make) a subset of the K1 first type carrier(s); the first type carrier set includes K1 first type carrier(s). The time block #1 to time block #(M2), shown in the figure, all belong to a first sub-time window in the present disclosure. The M2 is an integer greater than 1. The K1 is an integer greater than 1. The j, shown in the figure, is a positive integer greater than 1 and less than M2.

In a sub-embodiment, two temporally adjacent first type radio signals respectively occupy two orthogonal first type carriers.

In a sub-embodiment, the K1 first type carriers are orthogonal in the frequency domain.

In a sub-embodiment, the K1 first type carriers are discrete in the frequency domain.

In a sub-embodiment, there are at least two of the M2 first type carriers that occupy the same frequency domain resources.

In a sub-embodiment, the K1 is not greater than the M2.

Embodiment 8

Figure 8:
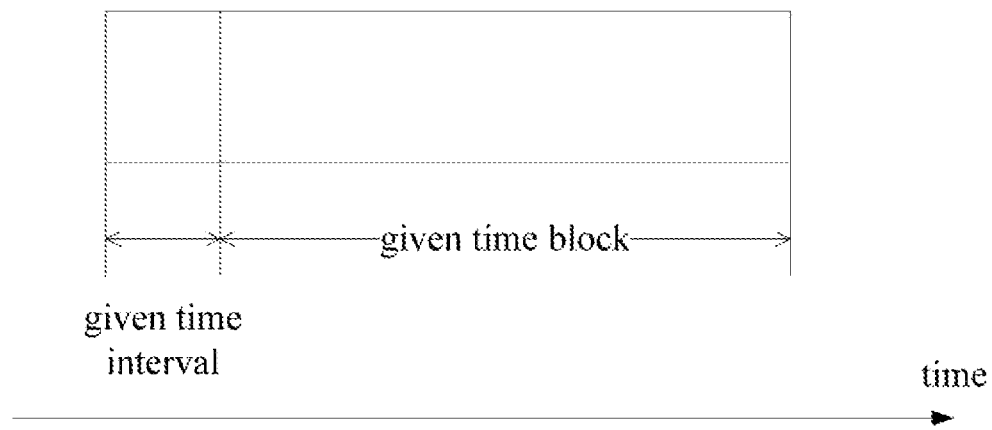
FIG. 8 shows a schematic diagram of a given time interval according to one embodiment of the present disclosure.

Embodiment 8 illustrates a schematic diagram of a given time interval, as shown in FIG. 8. In FIG. 8, the given time interval is located outside a given time block. The given time interval is any one of the M1 time intervals in this disclosure. The given time block is a time block corresponding to the given time interval.

In a sub-embodiment, the given time interval occupies a positive integer number of multi-carrier symbol(s) in the time domain.

In a sub-embodiment, the data transmission in the given time block starts with the first given multi-carrier symbol in the given time block.

In a subsidiary embodiment of the sub-embodiment, the given multi-carrier symbol is a multi-carrier symbol other than multi-carrier symbols used to transmit a DMRS (Demodulation Reference Signal) or a Sounding Reference Signal (SRS) in the given time block.

Embodiment 9

Figure 9:
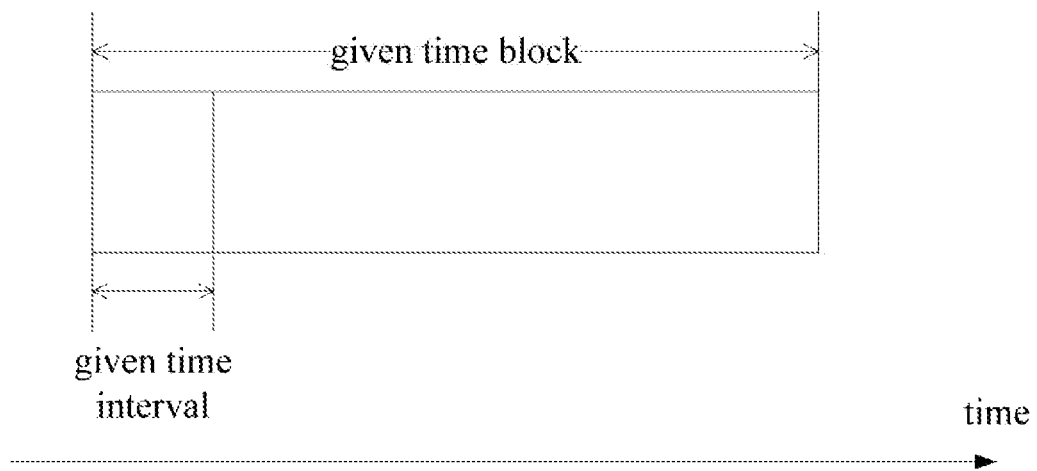
FIG. 9 shows a schematic diagram of a given time interval according to another embodiment of the present disclosure.

Embodiment 9 illustrates a schematic diagram of a given time interval according to another embodiment; as shown in FIG. 9. The given time interval is located in a given time block. The given time interval is any one of the M1 time intervals in this disclosure. The given time block is a time block corresponding to the given time interval In a sub-embodiment, the given time interval occupies a positive integer number of multi-carrier symbol(s) in the time domain.

In a sub-embodiment, the data transmission in the given time block starts with a first given multi-carrier symbol in the given time block and outside the given time interval.

In a subsidiary embodiment of the sub-embodiment, the given multi-carrier symbol is a multi-carrier symbol other than multi-carrier symbols used to transmit a DMRS (Demodulation Reference Signal) or a Sounding Reference Signal (SRS) in the given time block.

Embodiment 10

Figure 10:
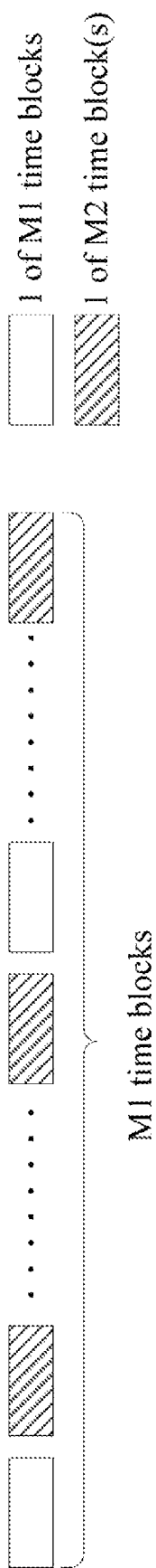
FIG. 10 shows a schematic diagram of M2 time block(s) according to one embodiment of the present disclosure.

Embodiment 10 illustrates a schematic diagram of M2 time block(s), as shown in FIG. 10. In FIG. 10, M2 time block(s) belongs(belong) to M1 time block(s). The M1 is not less than the M2. The M2 is a non-negative integer. The M1 is a positive integer.

In a sub-embodiment, the M2 is equal to 0, and the transmitting power of the UE in the M1 time blocks is zero.

In a sub-embodiment, the M2 is equal to the M1.

Embodiment 11

Figure 11:
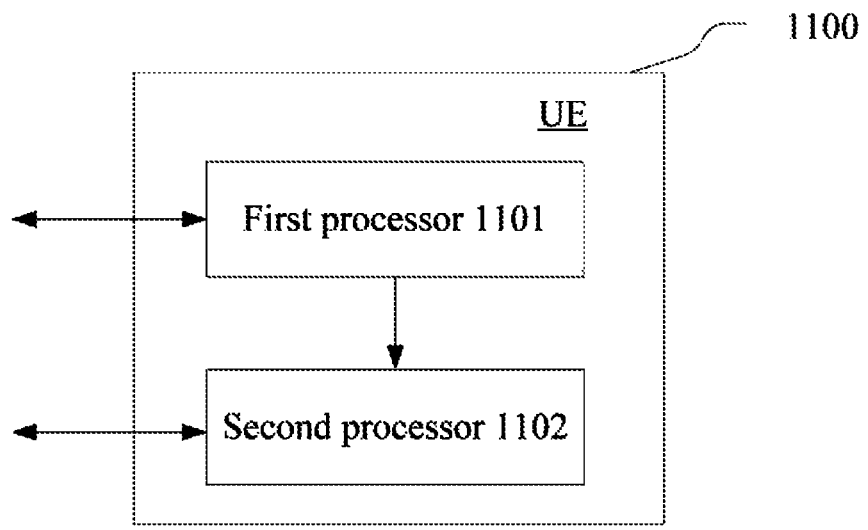
FIG. 11 shows a block diagram of a processing device in a UE according to one embodiment of the present disclosure.

Embodiment 11 illustrates a structural block diagram of a processing device in a UE, as shown in FIG. 11. In FIG. 11, the processing device 1100 in the user equipment is primarily comprised of a first receiver 1101 and a first transmitter 1102:

a first transceiver 1101, respectively transmitting M2 first type radio signal(s) in M2 time block(s) of M1 time blocks;

a second transceiver 1102, transmitting a second type radio signal;

In Embodiment 11, the second type radio signal is used to determine at least the former of the M2 time block(s) and M2 first type carrier(s); time domain resources occupied by the second type radio signal are behind the M2 time block(s); the M2 first type radio signal(s) is(are) transmitted on the M2 first type carrier(s) respectively; the M1 is a positive integer greater than 1; the M2 is 0 or a positive integer; the M2 is not greater than the M1; a first bit block is used to generate the M2 first type radio signal(s).

In a sub-embodiment, the first transceiver 1101 further receives first signaling; the first signaling is used to determine a first time window; the M1 time blocks belong to the first time window.

In a sub-embodiment, the first transceiver 1101 further receives second signaling; the second signaling is used to determine K1 first type carrier(s); at least one of the K1 first type carrier(s) is employed on unlicensed spectrum; the M2 first type carrier(s) makes(make) a subset of the K1 first type carrier(s).

In a sub-embodiment, the first transceiver 1101 further performs M1 times of monitoring in M1 time intervals respectively; the M1 times of monitoring are respectively used to determine whether to transmit the first type radio signal(s) on the M1 time blocks.

In a sub-embodiment, the second transceiver 1102 also receives a first HARQ-ACK; the first HARQ-ACK is used to determine whether the first bit block is correctly received.

In a sub-embodiment, the first time window includes Q1 first sub-time window(s); for each of the Q1 first sub-time window(s); transmitting respectively M2 first type radio signal(s) in M2 time block(s) of the M1 time blocks and transmitting the second type radio signal; the M1 time blocks belong to the corresponding first sub-time windows; the first bit block is used to generate all the M2 first type radio signal(s) that are transmitted by the user equipment in the first time window; the Q1 is a positive integer.

In a sub-embodiment, the monitoring comprises a positive integer number of time(s) of listening-before-talk (LBT), and the positive integer number of time(s) of listening-before-talk is for one the first type carrier.

In a sub-embodiment, the first transceiver 1101 includes at least the first two of the receiver/transmitter 456, the receiving processor 452, the transmitting processor 455, and the controller/processor 490 in Embodiment 4.

In a sub-embodiment, the second transceiver 1102 includes at least the first two of the receiver/transmitter 456, the receiving processor 452, the transmitting processor 455, and the controller/processor 490 in Embodiment 4.

Embodiment 12

Figure 12:
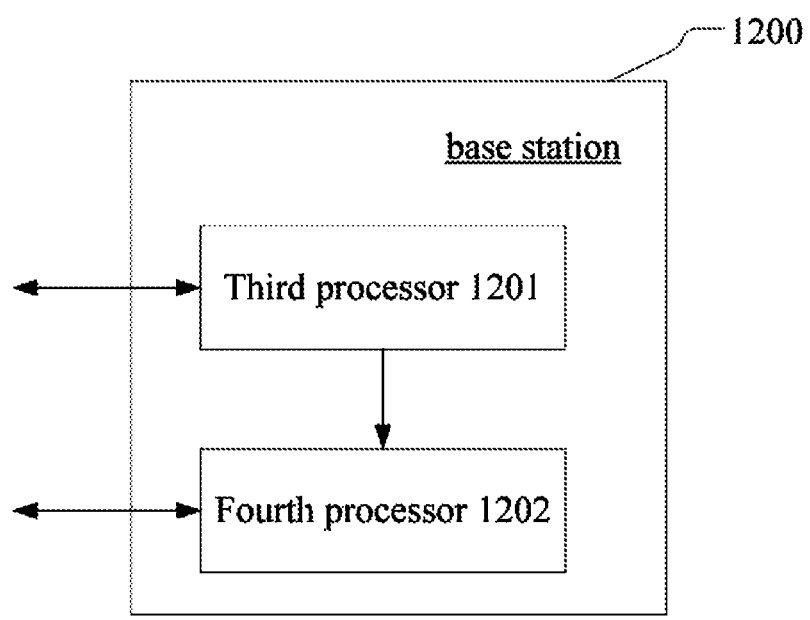
FIG. 12 shows a block diagram of a processing device in a base station according to one embodiment of the present disclosure.

Embodiment 12 illustrates a structural block diagram of a processing device in the base station equipment, as shown in FIG. 12. In FIG. 12, the base station device 1200 is primarily comprised of a third transceiver 1201 and a fourth transceiver 1202.

The third transceiver 1201, which respectively receives M2 first type radio signal(s) in M2 time block(s) of the M1 time blocks.

The fourth transceiver 1202, which receives the second type radio signal.

In Embodiment 12, the second type radio signal is used to determine at least the former of the M2 time block(s) and M2 first type carrier(s); time domain resources occupied by the second type radio signal are behind the M2 time block(s); the M2 first type radio signal(s) is(are) transmitted on the M2 first type carrier(s) respectively; the M1 is a positive integer greater than 1; the M2 is 0 or a positive integer; the M2 is not greater than the M1; first bit block is used to generate the M2 first type radio signal(s).

In a sub-embodiment, the third transceiver 1201 further transmits first signaling; the first signaling is used to determine a first time window, the M1 time blocks belong to the first time window.

In a sub-embodiment, the third transceiver 1201 further transmits a second signaling; the second signaling is used to determine K1 first type carrier(s); at least one of the K1 first type carrier(s) is employed on unlicensed spectrum; the M2 first type carrier(s) makes(make) a subset of the K1 first type carrier(s).

In a sub-embodiment, the fourth transceiver 1202 also transmits a first HARQ-ACK; the first HARQ-ACK is used to determine whether the first bit block is correctly received.

In a sub-embodiment, the first time window includes Q1 first sub-time window(s); for each of the Q1 first sub-time window(s), t receiving M2 first type radio signal(s) in M2 time block(s) of M1 time blocks respectively and receiving the second type radio signal is performed once; the M1 time blocks belong to the corresponding first sub-time windows; the first bit block is used to generate all the M2 first type radio signal(s) that transmitted by the transmitter of the second type radio signal in the first time window; the Q1 is a positive integer.

In a sub-embodiment, the third transceiver 1201 includes at least the first three of the receiver/transmitter 416, the receiving processor 412, the transmitting processor 415, and the controller/processor 440 in Embodiment 4.

In a sub-embodiment, the fourth transceiver 1202 includes at least the first three of the receiver/transmitter 416, the receiving processor 412, the transmitting processor 415, and the controller/processor 440 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (TOT), RFID terminals, NB-IOT terminals, Machine Type Communication (MTC) terminals, enhanced MTC (eMTC) terminals, data cards, low-cost mobile phones, low-cost tablet computers, etc. The base station in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for unlicensed spectrum communication, comprising:
    transmitting M2 first type radio signal in M2 time block of M1 time blocks respectively; and
    transmitting a second type radio signal;
    wherein the second type radio signal explicitly indicates at least the former of time domain position of the M2 time block or M2 first type carrier; time blocks occupied by the second type radio signal are behind the M2 time block; the M2 first type radio signal is transmitted on the M2 first type carrier respectively; the M1 is a positive integer greater than 1; the M2 is 1; a first bit block is used to generate the M2 first type radio signal; the second type radio signal indicates a time domain position of the M2 first type radio signal; the second type radio signal is transmitted on a Physical Uplink Shared Channel (PUSCH); a transport channel corresponding to the first type radio signal is a Uplink Shared Channel (UL-SCH); a first time window comprises Q1 first sub-time windows; for each first sub-time window in the Q1 first sub-time windows, transmitting M2 first type radio signal in M2 time block of M1 time blocks respectively and transmitting the second type radio signal is performed once; the M1 time blocks belong to the first sub-time window corresponding to the M1 time blocks; the first bit block is used to generate the M2 first type radio signal transmitted by the user equipment (UE) in the first time window; the Q1 is a positive integer.

2. The method according to claim 1, comprising:
receiving a first signaling;
wherein the first signaling is used to determine a first time-window, the M1 time blocks belong to the first time-window;
or,
receiving a second signaling;
wherein the second signaling is used to determine K1 first type carriers; at least one of the K1 first type carriers is employed on unlicensed spectrum; the M2 first type carrier makes a subset of the K1 first type carriers.

3. The method according to claim 1, comprising:
receiving a first hybrid automatic repeat request acknowledgement;
wherein the first hybrid automatic repeat request acknowledgement is used to determine whether the first bit block is correctly received.

4. The method of claim 3, wherein the monitoring comprises a positive integer number of times of listening-before-talk (LBT); the positive integer number of times of LBT are directed for one the first type carrier.

5. A method in a base station for unlicensed spectrum communication, comprising:
receiving M2 first type radio signal respectively in M2 time block of M1 time blocks; and
receiving a second type radio signal;
wherein the second type radio signal explicitly indicates at least the former of time domain position of the M2 time block or the M2 first type carrier; the time domain resources occupied by the second type radio signal are behind the M2 time block; the M2 first type radio signal is respectively transmitted on the M2 first type carrier; the M1 is a positive integer greater than 1, the M2 is 1; a first bit block is used to generate the M2 first type radio signal; the second type radio signal indicates a time domain position of the M2 first type radio signal; the second type radio signal is transmitted on a Physical Uplink Shared Channel (PUSCH); a transport channel corresponding to the first type radio signal is a Uplink Shared Channel (UL-SCH); a first time window comprises Q1 first sub-time windows; for each first sub-time window in the Q1 first sub-time windows, receiving M2 first type radio signal in M2 time block of M1 time blocks respectively and receiving the second type radio signal is performed once; the M1 time blocks belong to the first sub-time window corresponding to the M1 time blocks; the first bit block is used to generate the M2 first type radio signal transmitted by the transmitter of the second type radio signal in the first time window; the Q1 is a positive integer.

6. The method of claim 5, comprising:
transmitting a first signaling;
wherein the first signaling is used to determine a first time window; the M1 time blocks belong to the first time window;
or,
transmitting a second signaling;
wherein the second signaling is used to determine K1 first type carriers; at least one of the K1 first type carriers is employed on unlicensed spectrum; the M2 first type carrier is a subset of the K1 first type carriers;
or,
transmitting a first hybrid automatic repeat request acknowledgement;
wherein the first hybrid automatic repeat request acknowledgement is used to determine whether the first bit block is correctly received.

7. A user equipment (UE) for unlicensed spectrum communication, comprising:
a first transceiver, transmitting M2 first type radio signal respectively in M2 time block in the M1 time blocks; and
a second transceiver, transmitting a second type radio signal;
wherein the second type radio signal explicitly indicates at least the former of time domain position of the M2 time block or the M2 first type carrier; the time domain resources occupied by the second type radio signal are behind the M2 time block; the M2 first type radio signal is transmitted on the M2 first type carrier respectively; the M1 is a positive integer greater than 1; the M2 is 1; a first bit block is used to generate the M2 first type radio signal; the second type radio signal indicates a time domain position of the M2 first type radio signal; the second type radio signal is transmitted on a Physical Uplink Shared Channel (PUSCH); a transport channel corresponding to the first type radio signal is a Uplink Shared Channel (UL-SCH); a first time window comprises Q1 first sub-time windows; for each of the first sub-time window in the Q1 first sub-time windows; performing once of transmitting respectively M2 first type radio signal in M2 time block of the M1 time blocks and transmitting the second type radio signal; the M1 time blocks belong to the first sub-time window corresponding to the M1 time blocks; the first bit block is used to generate the M2 first type radio signal transmitted by the user equipment in the first time window; the Q1 is a positive integer.

8. The UE of claim 7, wherein the first transceiver receives a first signaling; the first signaling is used to determine a first time window; the M1 time blocks belong to the first time window.

9. The UE of claim 7, wherein the first transceiver receives a second signaling; the second signaling is used to determine K1 first type of carriers; at least one of the K1 first type carriers is employed on unlicensed spectrum; the M2 first type carrier makes a subset of the K1 first type carriers.

10. The UE of claim 7, wherein the first transceiver performs M1 times of monitoring respectively in M1 time intervals; the M1 times of monitoring are respectively used to determine whether to transmit the first type radio signal in the M1 time blocks.

11. The UE of claim 7, wherein the second transceiver receives a first hybrid automatic repeat request acknowledgement; the first hybrid automatic repeat request acknowledgement is used to determine whether the first bit block is received correctly.

12. The UE of claim 7, wherein the monitoring comprises a positive integer number of times of listening-before-talk; the positive integer times of listening-before-talk are directed for one the first type carrier.

13. A base station for unlicensed spectrum communication, comprising:
a third transceiver, receiving M2 first type radio signal in M2 time block of M1 time blocks respectively; and
a fourth transceiver, receiving a second type radio signal;
wherein the second type radio signal explicitly indicates at least the former of time domain position of the M2 time block or the M2 first type carrier; the time domain resources occupied by the second type radio signal are behind the M2 time block; the M2 first type radio signal is transmitted on the M2 first type carrier respectively; the M1 is a positive integer greater than 1; the M2 is 1; a first bit block is used to generate the M2 first type radio signal; the second type radio signal indicates a time domain position of the M2 first type radio signal; the second type radio signal is transmitted on a Physical Uplink Shared Channel (PUSCH); a transport channel corresponding to the first type radio signal is a Uplink Shared Channel (UL-SCH); a first time window comprises Q1 first sub-time windows; for each of the first sub-time window in the Q1 first sub-time windows, transmitting M2 first type radio signal in M2 time block of M1 time blocks respectively and transmitting the second type radio signal is performed once; the M1 time blocks belong to the first sub-time window corresponding to the M1 time blocks; the first bit block is used to generate the M2 first type radio signal transmitted by the transmitter of the second type radio signal in the first time window; the Q1 is a positive integer.

14. The base station of claim 13, wherein the third transceiver transmits a first signaling; the first signaling is used to determine a first time window; the M1 time blocks belong to the first time window.

15. The base station of claim 13, wherein the third transceiver transmits a second signaling; the second signaling is used to determine K1 first type carriers; at least one of the K1 first type carriers is employed on unlicensed spectrum; the M2 first type carrier makes a subset of the K1 first type carriers.

16. The base station of claim 13, wherein the fourth transceiver transmits a first hybrid automatic repeat request acknowledgement; the first hybrid automatic repeat request acknowledgement is used to determine whether the first bit block is received correctly.

* * * * *